Oct. 20, 1936. S. M. COFFMAN 2,057,817
SAFETY BRAKE FOR VEHICLES
Filed Jan. 8, 1934 2 Sheets-Sheet 2
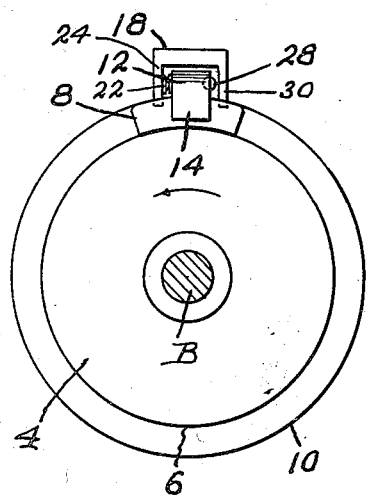
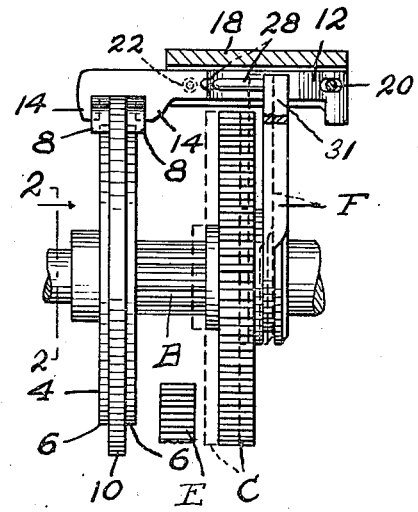
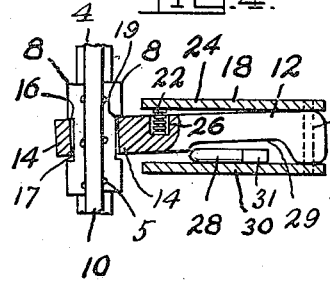
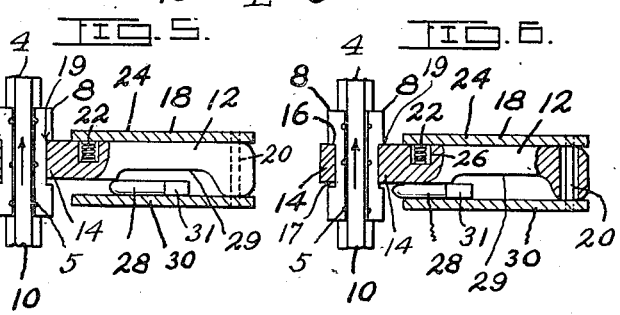
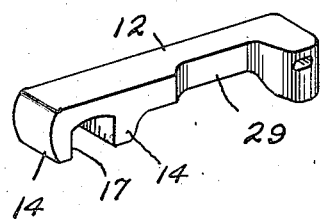
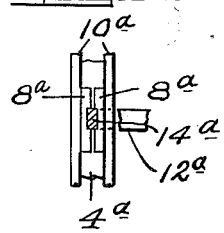
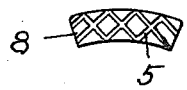
INVENTOR:
Samuel M. Coffman,
BY
F. G. Fischer,
ATTORNEY.

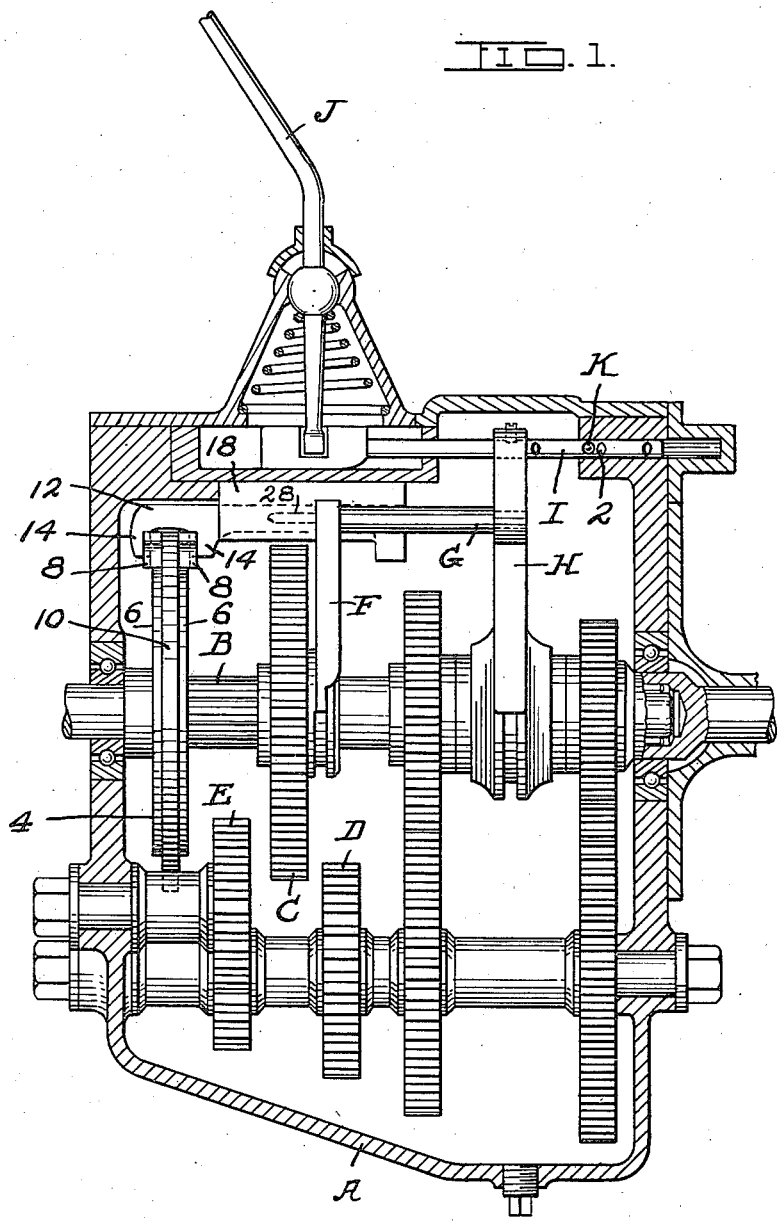

Patented Oct. 20, 1936

2,057,817

UNITED STATES PATENT OFFICE 2,057,817

SAFETY BRAKE FOR VEHICLES

Samuel M. Coffman, Kansas City, Mo., assignor of one-third to Lily O. Coffman, Kansas City, Mo.

Application January 8, 1934, Serial No. 705,784

3 Claims. (Cl. 192—4)

My invention relates to safety brakes for preventing accidents due to automotive vehicles running backwardly down grade when the engine becomes stalled, and one object is to provide a brake of this character which will automatically act to prevent backward movement of the vehicle the instant the same ceases to move forward.

Another object is to provide a brake of this character with manually controlled means which may be adjusted to one point to permit the vehicle to be backed by hand, or adjusted to another point to allow the vehicle to be backed under its own power.

Another object is to so arrange the parts that the manual operation of the brake may be performed with the customary gear shift lever.

A further object is to provide a brake of this character of simple and inexpensive construction, which may be readily installed, is positive in action and not likely to get out of order.

In order that the invention may be fully understood, reference will now be had to the accompanying drawings, in which:

Fig. 1 shows the safety brake installed in the transmission case of an automotive vehicle.

Fig. 2 is an elevational view of certain parts of the safety brake associated with a main shaft shown in cross section on line 2—2 of Fig. 3.

Fig. 3 is a side elevation partly in section of the safety brake.

Fig. 4 is a plan view partly in section of certain parts of the safety brake mechanism in active position.

Fig. 5 is a view similar to Fig. 4 with the safety brake in inactive position to permit the vehicle to be backed by hand.

Fig. 6 is a view similar to Fig. 5, except that the safety brake is in inactive position to permit the vehicle to be backed by the power of the engine when the reverse gears of the transmission mechanism are in mesh.

Fig. 7 is a detail perspective view of an arm forming part of the invention.

Fig. 8 is a detail perspective view of a nonrotatable brake member forming part of the invention.

Fig. 9 shows the reverse side of the brake member disclosed by Fig. 8.

Fig. 10 is a detail of a modified form of the brake assembly forming part of the invention.

Referring more particularly to Fig. 1, A designates the transmission case of an automotive vehicle. Said transmission case A contains the usual main shaft B equipped with the low and reverse slidable gear C adapted to be shifted forwardly to intermesh with the low forward speed gear D, or shifted rearwardly into mesh with the reverse idler gear E. The gear C is shifted in the usual manner upon the shaft B by means of a shifter fork F secured to a shifter bar G carried by a shifter fork H fixed upon the low and reverse shifter bar I manually controlled by the gear shifter lever J. All of the foregoing may be of usual construction, the principal difference being that the shifter bar I has an extra notch 2 for the entrance of the usual spring pressed detent K.

Referring now more particularly to the parts forming the present invention, 4 designates a rotary brake member fixed upon the shaft B and provided with a pair of oppositely-disposed concentric shoulders 6 upon which a pair of nonrotary brake members 8 lightly rest in order to be in position to clamp opposite sides of a raised central peripheral portion 10 of the rotary brake member 4.

The nonrotary brake members 8 are held in position upon the shoulders 6 by means of an arm 12 provided at its forward portion with a pair of fixed jaws 14 which fit into recesses 16 formed in the intermediate portions of the respective surfaces of said nonrotary brake members 8. The brake members 8 are provided with grooves 5 for the entrance of a portion of the lubricant in the transmission case A.

The arm 12 is operably mounted within a housing 18 in which it is loosely held by means of a retaining pin 20 which extends through the rear portion of said arm 12 and the housing 18. The housing 18 is fixed at its upper portion to the adjacent part of the transmission case A and is open at its underside to permit the forward end of the arm 12 to rest upon the nonrotary brake members 8, as shown by Figs. 1 to 3, inclusive. The forward portion of the arm 12 is of less width than its rear end in order to leave space between it and the wall 30 of the housing so that said forward end may be urged into active position, Fig. 4, by means of a coil spring 22 abutting at one end against the adjacent housing wall 24 and at its opposite end against the inner end of a recess 26 formed in the adjacent side of the arm 12. When the arm 12 is urged into active position the corner 17 of one jaw 14 and the corner 19 of the companion jaw clamp the respective nonrotary brake members 8 firmly against the rotary brake member 4.

The present invention also contemplates the provision of means for adjusting the arm 12 to idle position, Figs. 5 and 6, so that the vehicle may be either manually backed or backed under the power of the engine. In the present instance said means comprises an element 28 arranged between the recessed portion 29 of the arm 12 and the housing wall 30. The element 28 is fixed at its rear end to a projection 31 extending upwardly into the housing 18 from the shifter fork F, so that when the latter is shifted rearwardly to move the gear C towards the idler and reverse gear E said element 28 will engage and throw the arm 12 to inactive position.

When it is desired to manually back the vehicle in a garage or other place it is important that the element 28 be shifted rearwardly just far enough, Fig. 5, to throw the arm 12 to inactive position without meshing the gear C with the gear E, (see dotted lines, Fig. 3), as it would be difficult if not impossible to manually back the vehicle should the gear C become intermeshed with the gear E. Hence, I provide the extra notch 2 in the shifter bar I so that the operator of the lever J may readily determine the position of the element 28 and the relative position of the gear C with respect to the gear E.

In practice when the vehicle is traveling forward the rotary brake member 4 rotates in a direction (see arrows, Figs. 5 and 6,) to hold the non-rotary brake members 8 in idle or inactive position, but should the vehicle become stalled while ascending a grade it is instantly checked against backward movement by the action of the spring 22 which automatically forces the arm 12 to active position, Fig. 4, so that it in turn will cause the non-rotary brake members 8 to firmly clamp the rotary brake member 4 and thus securely hold the same from backward rotation. The amount of pressure exerted by the brake members 8 upon the brake member 4 will be in accordance with the inclination of the grade, that is, the steeper the grade the greater the pressure of the brake members 8 upon the brake member 4 so that there will be no danger of the vehicle accidentally backing down a steep incline. As the safety-brake members 4 and 8 hold the vehicle from backward movement without the aid of either the service or emergency brakes, the engine can be readily started without danger of becoming stalled by failure of the driver to release said service or emergency brakes at the proper time.

It has already been described how the element 28 may be adjusted to permit the vehicle to be manually backed before the gear C is thrown into mesh with the gear E, or backed under the power of the engine after the gear C has been shifted into mesh with the gear E.

Preferably, the safety-brake members 4 and 8 are located within the transmission case A where they will receive ample lubrication, but it is to be understood that said safety-brake members may be located at any suitable point along the transmission mechanism from the engine shaft to the drive wheels of the vehicle, inclusive, and the phrase "transmission mechanism" is employed in the appended claims with that understanding.

In the modified form disclosed by Fig. 10 the safety-brake mechanism is substantially the same as that above described, as is evidenced by corresponding reference numerals with exponents a, the chief difference being that the rotary brake member 4a is provided with a pair of flanges or raised peripheral portions 10a spaced apart to admit the non-rotary brake members 8a, between which the single jaw 14a of the arm 12a projects. With this modified arrangement it is apparent that when the arm 12a is adjusted to active position the jaw 14a will be adjusted out of parallelism with the nonrotary brake members 8a and simultaneously press the latter outwardly against the respective flanges 10a of the rotary brake member 4a.

While I have described the safety brake as applied to an automotive vehicle it is obvious that it may also be applied to trailers and other vehicles to prevent the same from accidentally backing down grade.

From the foregoing description it is apparent that I have provided a device embodying the advantages above pointed out, and while I have shown a preferred and a modified form of some of the parts, I reserve all rights to such other changes and modifications as properly fall within the spirit and scope of the invention as claimed.

Having thus described my invention, what I claim and desire to secure by Letters Patent, is:

1. In combination with the transmission mechanism of an automotive vehicle including an idle reverse gear, a low and reverse gear, a rotary shaft upon which the last-mentioned gear is slidably mounted, and shifting mechanism for shifting the last-mentioned gear in and out of mesh with the first mentioned gear; mechanism normally in position for preventing backward movement of the vehicle comprising a rotary brake member fixed to said shaft, nonrotary brake members held inactive by the rotary brake member during forward movement thereof but adapted to grip the latter to prevent backward rotation thereof when it comes to rest, an arm for actuating said nonrotary brake members, spring means for moving said arm to active position, an element controlled by the shifting mechanism for moving the arm to inactive position before the low and reverse gear is shifted in engagement with the idle reverse gear so that the vehicle may be manually backed, and means incorporated in the shifting mechanism for indicating when the arm is in position for permitting the vehicle to be manually backed, said last-mentioned means being adapted to prevent accidental movement of the shifting mechanism when the arm is in the last-mentioned position.

2. A mechanism of the character described comprising a rotary brake member adapted to be secured to a suitable rotary portion of a vehicle to prevent accidental backward movement thereof, a nonrotary brake member normally held in idle position by said rotary brake member during forward rotation thereof, an arm for adjusting said nonrotary brake member into active engagement with the rotary brake member when the latter ceases to rotate forwardly, a housing in which said arm is operably mounted, spring means interposed between a portion of said housing and the arm for moving the latter to active position, and a manually controlled element interposed between the housing and the arm for moving the same to inactive position.

3. In combination with the transmission mechanism of an automotive vehicle including a reverse idler gear, a low and reverse gear, a rotary shaft upon which the last-mentioned gear is slidably mounted, and shifting mechanism including a fork for shifting the last-mentioned gear in and out of mesh with the first-mentioned gear; mechanism normally in position for preventing backward rotation of the rotary shaft comprising a rotary brake member fixed to said shaft, an arm substantially paralleling the axis of the shaft and adapted to prevent backward rotation of said rotary brake member, spring means urging said arm to active position, and an element on the shifting fork for moving said arm to inactive position as the shifting fork moves the low and reverse gear towards the idle reverse gear.

SAMUEL M. COFFMAN.